H. S. Ross,
Saw Sharpener.
No. 98,803. Patented Jan. 11, 1870.
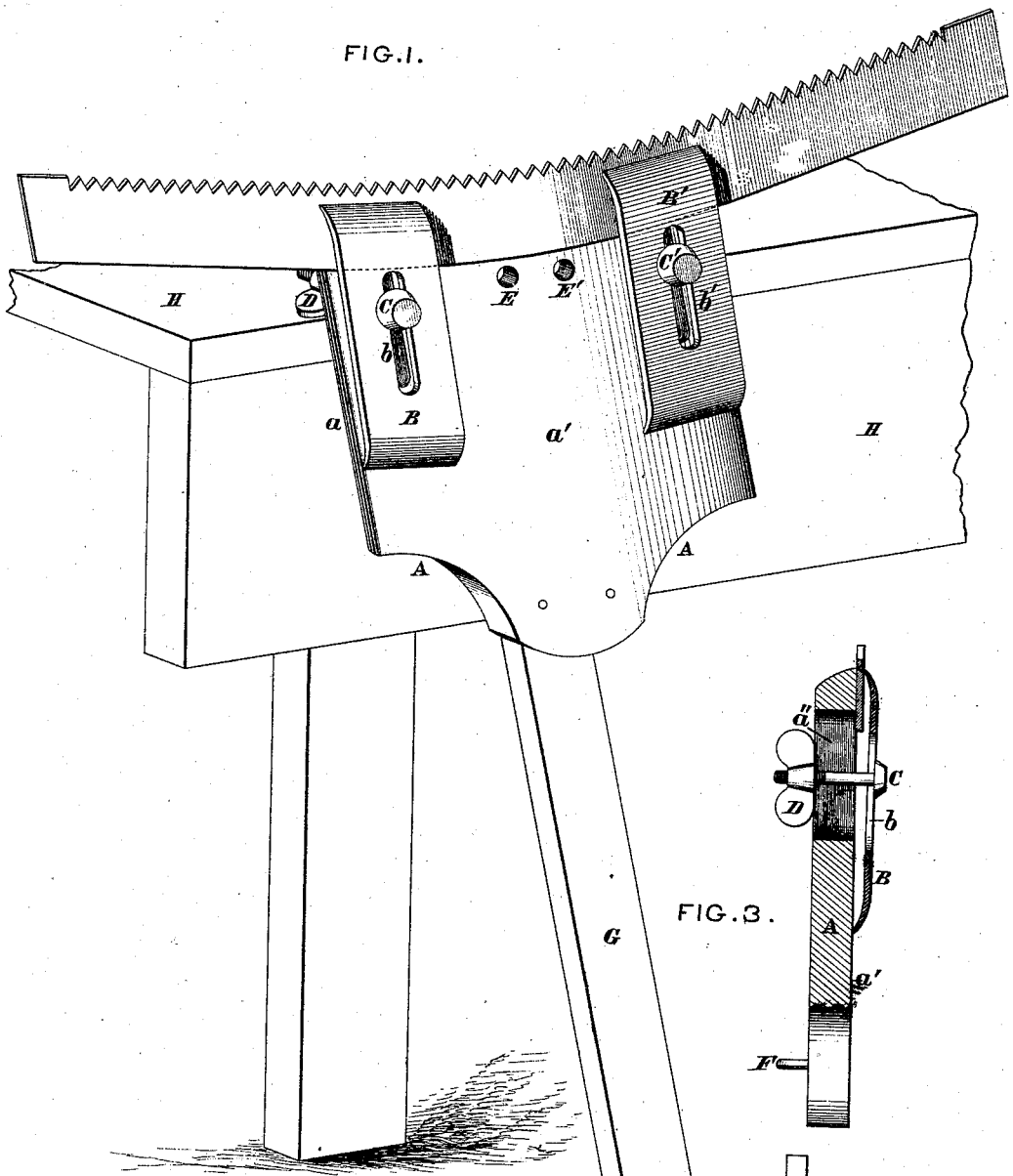

United States Patent Office.

HERVY S. ROSS, OF MILLVILLE, OHIO.

Letters Patent No. 98,803, dated January 11, 1870.

IMPROVEMENT IN VISE FOR HOLDING SAWS WHILE BEING SHARPENED.

The Schedule referred to in these Letters Patent and making part of the same.

I, HERVY S. ROSS, of Millville, Butler county, Ohio, have invented a new and useful Vise for Holding Saws for Sharpening, of which the following is a specification.

*Nature and Objects of the Invention.*

My invention relates to a cheap, portable, and effective device for holding saws for sharpening.

*General Description with Reference to the Drawings.*

Figure 1 is a perspective view or my vise or holder, with a saw in position for filing.

Figures 2 and 3 are, respectively, a horizontal and a vertical section of my holder.

A is a slab of wood, of rectangular form, flat or concave on its rear, $a$, and convex on its front side, $a'$.

B B' are two spring-jaws or clamps, capable of being held firmly to the convex face or front of the slab A by two bolts, C C', which traverse slots, $a''$ $a'''$, $b$ $b'$, in the slab and clamps, respectively, and have suitable thumb-taps, D D'.

E E' are additional holes, to receive one or other bolt C or C', for operation on a short saw.

F is a staple, to receive the tenoned end of a leg, G.

*Operation.*

The thumb-taps D D' being slackened, and the bolts C C' raised or lowered, to suit the width of the saw, the latter is introduced, back downward, between the clamps B B' and the convex side of the slab A, so that its teeth shall just protrude above the tops of the said slab and clamps. The thumb-taps being now screwed home, act, through the clamps, to strain the saw tightly over the convex or rounded face of the slab, and thus hold the said saw firmly for the action of the file.

The clamps being elastic, and being so bowed or bent as that their extremities, only, touch the slab and saw respectively, operate to hold the toothed edge of the saw firmly to the upper portion of the slab.

The holder, with its saw thus clamped, is then set obliquely against a bench, H, or other fixed object, as shown in fig. 1, and is ready for use.

I have selected, to illustrate my invention, the form of holder successfully adopted by me, but may vary the same in non-essential particulars; for example, where very large saws are to be operated upon, one or more additional clamps may be employed.

The detachable leg G may be replaced by one permanently attached to the slab.

*Claim.*

The described arrangement of convex slab A $a$ $a'$ $a''$ $a'''$, spring-clamps B $b$ B' $b'$, bolts C C', and screw-taps D D', for the purpose explained.

In testimony of which invention, I hereunto set my hand.

HERVY S. ROSS.

Witnesses:
GEO. H. KNIGHT,
JAMES H. LAYMAN.